May 28, 1963 A. C. RUDOMANSKI ETAL 3,091,693
SELECTIVE RADIATION DETECTOR AND FREE-AIR THERMOMETER
Filed Sept. 16, 1959 3 Sheets-Sheet 1

ANDREW C. RUDOMANSKI
RUSSELL D. DE WAARD
ERIC M. WORMSER
*INVENTORS.*

BY

ATTORNEY

United States Patent Office 3,091,693
Patented May 28, 1963

3,091,693
SELECTIVE RADIATION DETECTOR AND
FREE-AIR THERMOMETER
Andrew C. Rudomanski, Stamford, Russell D. De Waard, Old Greenwich, and Eric M. Wormser, Stamford, Conn., assignors to Barnes Engineering Company, Stamford, Conn., a corporation of Delaware
Filed Sept. 16, 1959, Ser. No. 840,401
19 Claims. (Cl. 250—83.3)

This invention relates to new and improved selective radiation detectors particularly to infrared detectors and to free-air thermometers in which the new detectors may be used.

The problem of sharply wavelength selective detectors, particularly in the infrared, has long been a serious one. A solution in the infrared is described and claimed in the application of Barnes, Wormser, and De Waard, Serial No. 641,957, filed February 25, 1957, now Patent 2,981,913, April 25, 1961. These selective detectors comprised essentially an infrared sensitive device, such as a thermistor, and a sensitizing layer in heat conducting relation thereto. Between the infrared detector and the heat sensitizing material there is an effective infrared mirror such as a thin film of gold. The sensitizing material, which can be almost any stable chemical compound, will vary with the wavelength range to be covered. It absorbs infrared strongly in the range or band referred to, but it may also have other absorption bands. Infrared of the wavelength which is absorbed heats the sensitizing material. This heat is conducted rapidly through the thin gold film to the detector. Infrared of different wavelengths is either transmitted and then reflected from the gold layer or is reflected from the surface of the sensitizing material or both. As a result the detector responds primarily only to radiation of the bands which are absorbed. This type of selective detector constituted a great advance. However, for certain applications it fell short of perfection. The rejection by reflection, or transmittance and reflection was not perfect because many sensitizing materials absorbed somewhat in the radiation bands to be rejected and considerable problems were presented where the absorption was in more than one band. In such cases filtering means, such as optical interference filters, are necessary to remove the other band or bands. Here again the removal is not 100 percent and so the selectivity suffers somewhat.

The above described shortcomings from perfection are particuarly important in the development of a free-air thermometer. Such free-air thermometers also form an aspect of the present invention and the problem of free-air thermometers will first be described in order to bring out more clearly the advantages of the new detectors of the present invention which are particularly useful and significant in such instruments.

The problem of measuring the temperature of air on an airplane presents but little problem in subsonic flight. However, when speeds increase, ordinary thermometric means become unusable because the friction in supersonic flight heats up surfaces on an airplane to such high temperatures that in ordinary probe thermometers accurate measurement of air temperature soon becomes impossible. Neverthless measurement of the temperature of the surrounding atmosphere is of importance to the operation of high speed aircraft.

Essentially the free-air thermometer utilizes the emission in the infrared of a component of the atmosphere. For practical purposes oxygen, nitrogen and argon can-not be used as they do not show emission in the infrared in a sufficiently sharply defined band or bands and do not have sufficient energy to be practical. There are three other components of the atmosphere at various altitudes which do have suitable infrared emission in narrow bands. One of these is water vapor, which, while theoretically usable is practically not suitable. There is not sufficient water vapor in the atmosphere above the tropopause and as most high speed flight, particularly supersonic flight, normally takes place for the major portion of each flight in the stratosphere, a thermometer operating on water vapor emission is not useful. Another reason why water vapor is unsuitable is that its concentration, even in the troposphere, is not uniform.

A second component, ozone, has very suitable emission in the infrared at a wavelength just below 10 microns. However, the ozone is present only at certain levels in the upper atmosphere and so a free-air thermometer, operating under the principles of the present invention, while it would give excellent response to ozone emission, would have its usefulness limited to certain altitudes. In a broad aspect of the present invention, however, free-air thermometers, operating on ozone emission, are included but they are not preferred. The preferred constituent of the atmosphere is carbon dioxide. This is present in almost uniform percentage throughout the portion of the atmosphere which is usable for flight. The carbon dioxide emits in a band between 14 and 16 microns and its relative emittance is reasonably high throughout the range of atmospheric temperature normally encountered. The total energy available is therefore sufficient for operation of free-air thermometers based on the principles of the present invention and so such thermometers operating on the far infrared emission band of carbon dioxide constitute a preferred modification of the present invention.

The emission from the carbon dioxide molecules is absorbed by other carbon dioxide molecules which is what determines the minimum path length at the different altitudes. The condition may be considered as an equilibrium phenomenon. As the path length becomes longer more molecules of carbon dioxide emit and the total emission increases linearly with the past length. However, each increment of emission along the path length passes through a longer and longer absorption path. This absorption is not linear and increases very rapidly with path length. Hence the more distant molecules soon contribute negligible radiation to the detector and the path length is thereby established for a given bandwidth of detector response. The path length is an important matter because it is desired for the free-air thermometer to measure temperatures of air not too distant from the aircraft. Therefore, the path length for maximum detector response may be too long at higher altitudes and then it is desirable for the detector in the thermometer to respond to a band which is narrower than the total width of the carbon dioxide emission band.

The beam of infrared radiation from the selected atmospheric constituent, which in the preferred embodiment of the invention is carbon dioxide, is periodically interrupted by a rotating chopper or other occulting device. The device is designed so that when it occults the beam it is an effective infrared mirror which reflects onto the detector an image of a black body cavity, preferably maintained at a predetermined temperature. The detector, therefore, periodically receives infrared radiation from the air and from the black body reference. The interrupting or modulating means for the beam operates at a sufficiently low frequency, e.g., 20 to 100 c.p.s., so that the infrared detector can respond thereto. The detector, therefore, produces a modulated or A.C. signal of predetermined frequency which can then be amplified and measured by conventional means. Essentially the measurement is a comparison between the infrared radiation from the carbon dioxide component of the atmosphere and the standard represented by the black body cavity. Temperature effects from the highly heated airplane surfaces, which may reach the detector even though the latter is well insulated, do not enter into the measurement because they are not modulated at the frequency to which the A.C. amplifier of the detector output is responsive. Therefore even very great temperature rises in components of the aircraft produce substantially no effect on the measurement and if the reference black body is maintained at a constant temperature they have no effect at all. To put it another way the selective detector does not see infrared from the heated airplane parts but only from the carbon dioxide in the air surrounding the plane.

The invention will be described in greater detail in conjunction with the drawings in which.

Figure 1:
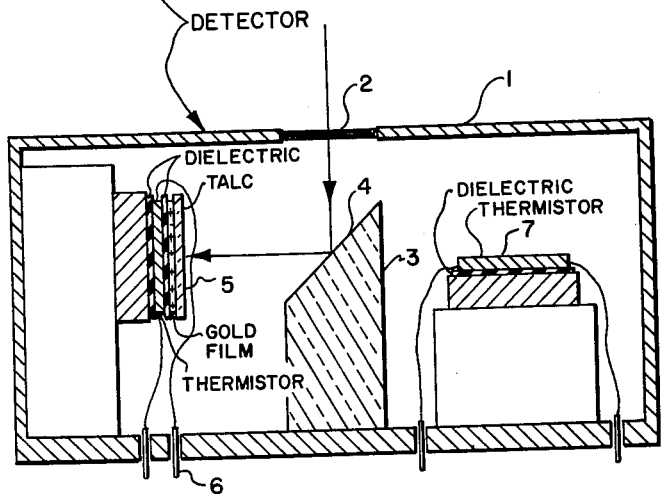
FIG. 1 is a cross section through the improved selective detector.
Figure 2:
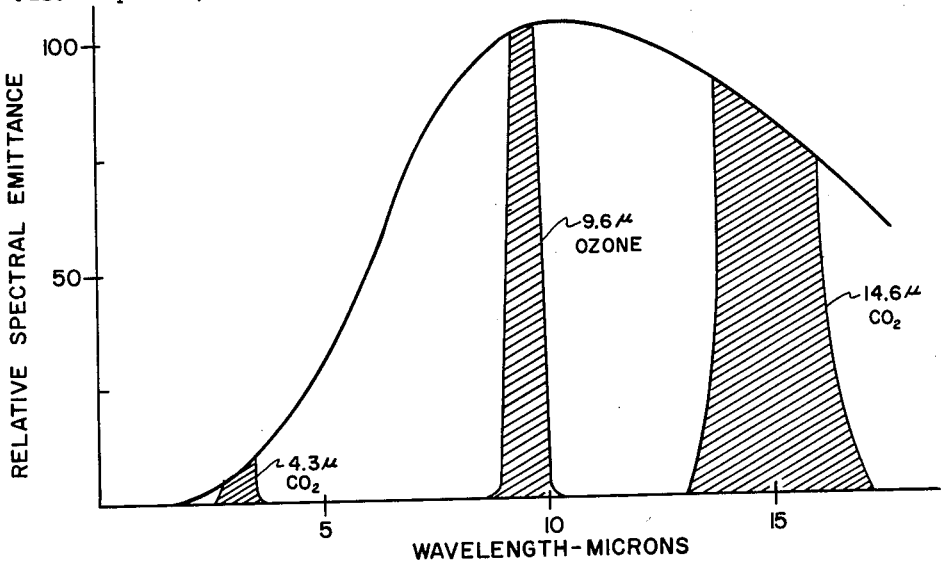
FIG. 2 is a graph of atmospheric emission in the infrared at 273° K.
Figure 5:
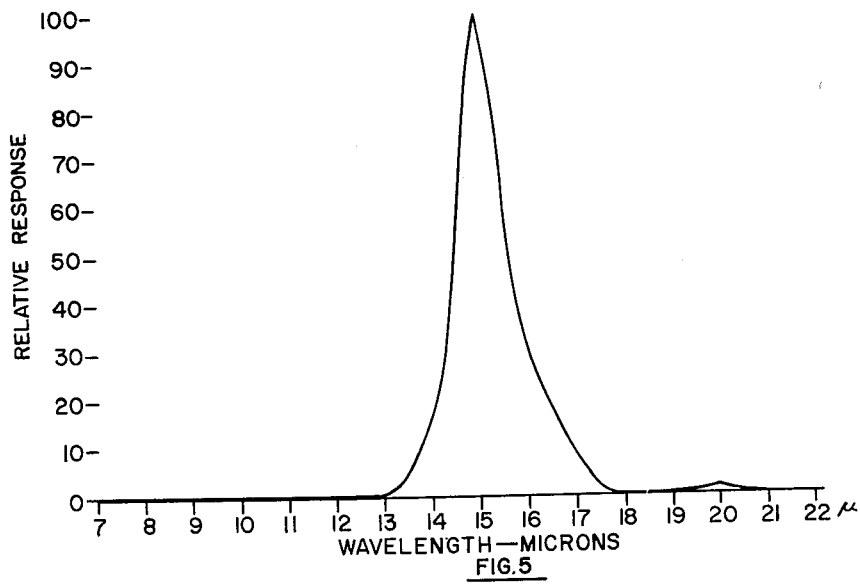
FIG. 5 is a graph of the response of the detector of FIG. 1.

The detector of FIG. 1 comprises a casing 1, a suitable mica window 2, which in the case of a free-air thermometer operating on carbon dioxide emission is mica, and a block of magnesium oxide 3 which has a polished surface 4. Radiant energy such as infrared radiation from the atmosphere passes through the window 2 striking the surface 4. Since the thickness of the magnesium oxide block 3 is far beyond the point at which it is transparent to infrared of a wavelength above 13 microns, a residual reflected ray is produced which contains substantially all of the received infrared radiation from just above 13 microns to beyond 20 microns. This ray strikes a selective detector 5 which comprises a thermistor, a thin gold film acting as a mirror and a layer of talc. The mica window 2 effectively cuts off the infrared beyond a wavelength of about 16 microns. The resulting response is shown in FIG. 5. Without the mica window the residual reflected ray would include infrared components up to a wavelength of more than 20 microns. The selective detector 5 is connected into the input of a suitable amplifier (not shown), by the wires 6. A second similar detector 7, which does not encounter the residual reflected ray, is connected as a comparison detector in accordance with conventional detector design so that changes in ambient temperature conditions in the detector chamber are cancelled out.

The response of the detector of FIG. 1 is shown graphically in FIG. 5. It will be noted that there is an extremely sharp rise in response at a wavelength of 14 microns. In the absence of the mica window the response would have continued to a wavelength beyond 20 microns. However, the mica window 2, which is formed of a 3.6 micron mica sheet supported on a ½ mil (.0005") polyglycol terephthalate sheet, cuts the transmission very markedly as the wavelength increases beyond 15 microns.

Figure 4:
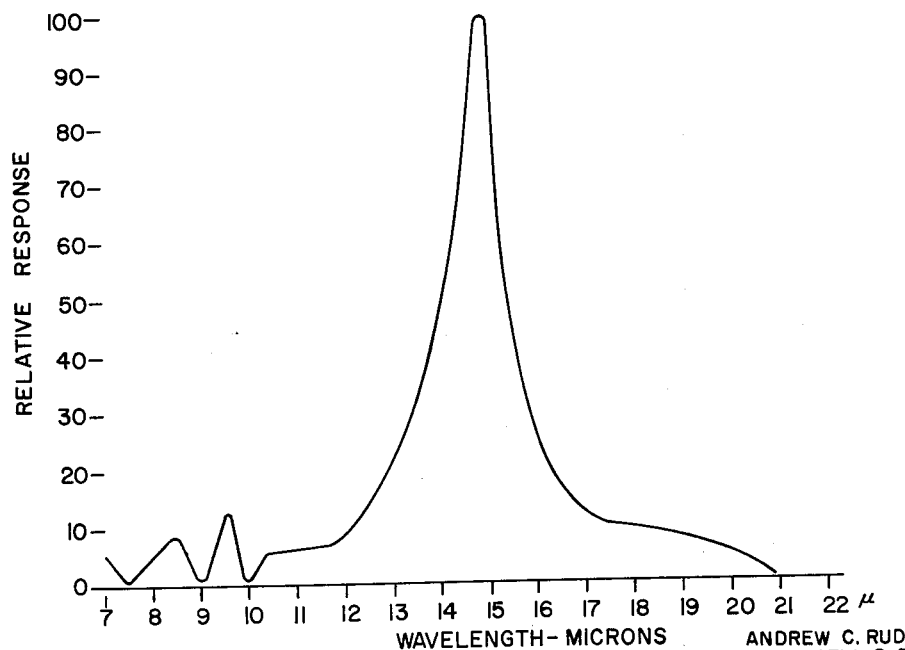
FIG. 4 is a graph of the response of the detector of FIG. 3 associated with an interference filter.
Figure 3:
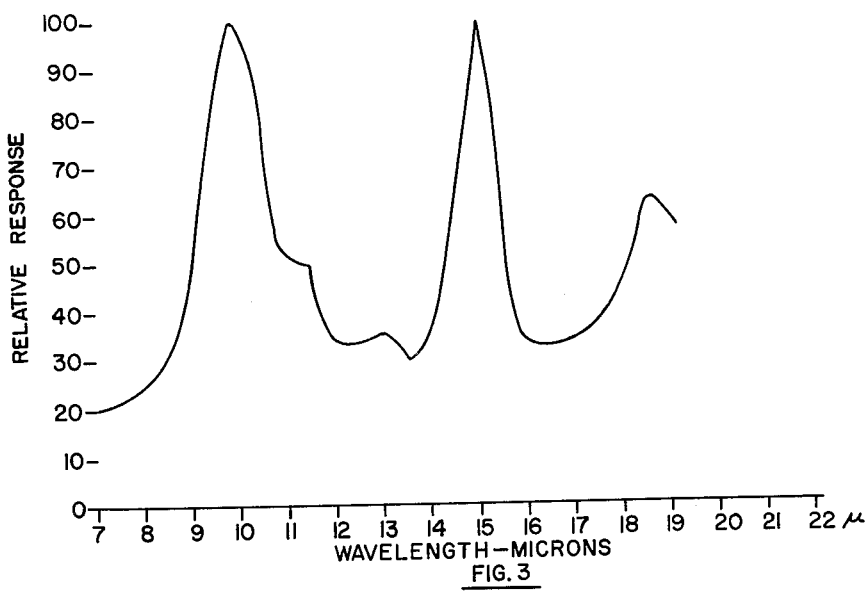
FIG. 3 is a graph of the response of a talc sensitized selective detector.

The talc sensitized detector alone shows an absorption with two peaks, one at about 15 microns and the other at about 9.6 microns. The detector can be provided with an interferenct filter to reject radiation at approximately 9.6 microns. This interference filter can be a sandwich of a layer of sodium chloride, one-half wavelength thick between two tellurium layers, 0.8 of a ¼ wavelength thick. The whole is mounted on a sodium chloride substrate sufficiently thick to give satisfactory mechanical strength. The response of the detector is shown in FIG. 4. It will be noted that the peak, at about 9.6 microns which appears in FIG. 3, has been greatly reduced. However, it has not been entirely eliminated and there is quite substantial response between 7 and 10 microns rising at some points to nearly 10 percent of the response at 15 microns. The response shown in FIG. 5, on the contrary, shows zero response up to 13 microns and rises then very rapidly to a sharp peak at 15 microns. When the detector is used in a free-air thermometer, as will be described below, the output is substantially degraded by spurious responses between 7 and 10 microns. The detector of FIG. 1, therefore, is much more accurate and more sensitive than the talc sensitized detector alone even when the latter is associated with the best available interference filter. One important advantage is that the detector is insensitive to interference from foreign bodies, such as other airplanes beyond the relatively short path length which is assured by the narrow response at 15 microns.

The detector has been described as applied to detecting the 14 to 16 micron band of carbon dioxide. This is the important region for free-air thermometers. However, the invention is not limited to the use of a selective detector and operating on a residual reflected ray in this region. Other materials may be used in place of the magnesium oxide to obtain residual rays in different parts of the spectrum. Thus, for example, sapphire gives a residual reflected ray having a response between 11 and 17 microns. Common plate glass responds between 8 and 14 microns and dolomite responds between 6 and 9 microns. It is also possible to use other materials, the response of which will be found at even shorter wavelengths. In other words, the detector of the type illustrated in FIG. 1 is applicable not only to detecting radiation from the 14 to 16 micron $CO_2$ band but is generally useful throughout a wide range of optical radiation. For maximum accuracy, is is desirable in each case to use a sensitized detector which responds to the particular residual reflected ray band. The choice of other typical materials is described in the application of Barnes, et al. above referred to.

The figures given above for the residual reflected ray bands of typical materials are, of course, for the whole band and portions of the band may be selected by using suitable filters as was done in FIG. 1 by using the mica filter which cut off response after about 15 microns.

The term "optical radiation" is used to define electromagnetic radiations which have wavelengths within the range where optical laws are obeyed within practical limits. Visible and ultraviolet light are therefore included as well as infrarad.

Figure 6:
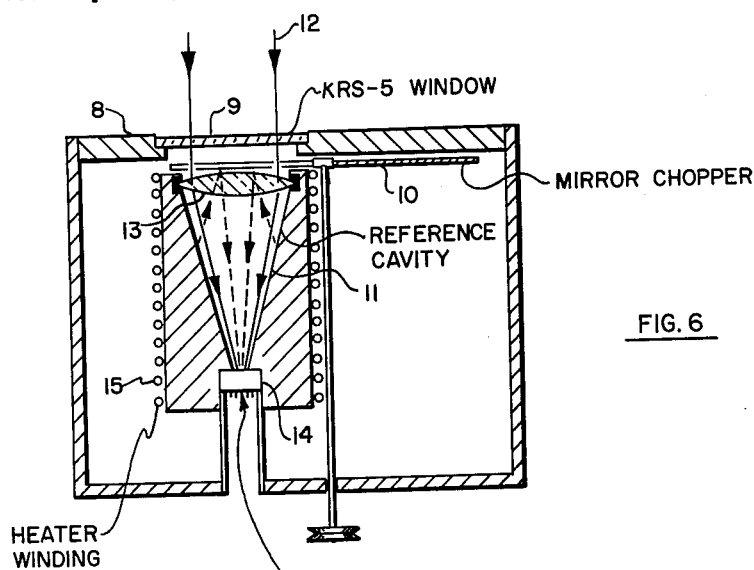
FIG. 6 is a cross section through a free-air thermometer.

FIG. 6 is a cross section through a free-air thermometer. The thermometer comprises a case 8, a window 9, which passes infra-red in the wavelength band of the carbon dioxide emission, a rotating mirror chopper 10 and a reference cavity 11 containing the detector. The chopper which has a gold plated mirror on the bottom parts of the chopper blades is driven from a suitable source (not shown) at a speed to modulate the incoming infrared beam 12 at a suitable low frequency, for example, 20 to 100 cycles per second. The reference cavity, the inner surface of which constitutes a black body, is provided with a lens 13, germanium metal, which focuses the beam into the detector 14. This detector may be of the same design as in FIG. 1 or it may be any other selective detector to be described below. The reference cavity 11 which is of metal painted with carbon black is maintained at a constant temperature, for example, 50° C. by an electric heater winding 15. When the mirror chopper permits the beam 12 to pass, the path is shown in solid arrows and as stated above is focused on the detector 14. When, however, a blade intervenes, the detector sees the reflected image of the reference cavity. These rays are shown dotted.

The free-air thermometer is normally located so that it looks out into the atmosphere ahead of the airplane. As shown, the beam comes from a fairly large cone. It can, of course, be collimated by conventional infrared optics so that the beam comes from a much narrower cone, for example, 1 to 3 degrees. These optics form no part of the present invention and are conventional.

In operation the free-air thermometer puts out a signal in which the output of the thermistor, when irradiated by the infrared beam, is compared with the output when viewing the image of the reference cavity. However, in an extensive range, for example, from 50 to minus 10° C., the output calibration is substantially linear. The reading of the detector output after suitable conventional amplification may be on any suitable instrument or the signal may be used for any other desired purpose, for example, as a part of the input information for an air speed computer.

It will be noted that the reference cavity is maintained at a temperature as high as the thermometer is to read. For many operations a 50° C. reference cavity is quite satisfactory. If higher temperatures are to be read, the temperature of the cavity can be suitably increased and a calibration for higher readings determined.

As far as the organization of elements in the free-air thermometer is concerned they are not changed by the nature of the selective detector used. In FIG. 6 of the drawing the improved selective detector of the present invention is illustrated. However, any other selective detector capable of responding to a portion of the emission band of carbon dioxide may be used. Thus, for example, a talc sensitized detector of the above referred to application of Barnes et al. may be used. This detector was described above in conjunction with the response shown in FIG. 4. The selective detector, of course, has to be provided with the described interference filter in order to remove the major portion of the unwanted response at the second absorption peak of the talc sensitizing layer.

The response of the instrument with such a detector is, of course, not as precise as with the detector of FIG. 1 as has been discussed above. However, the response is sufficiently good so that the free-air thermometer is operative although far less accurate than the better instrument using the detector of FIG. 1. This latter therefore constitutes the preferred embodiment of the invention insofar as free-air thermometers are concerned. In the broader aspects of the invention, however, any suitable selective detector is included.

We claim:

1. A selective detecting apparatus for a band of optical radiation comprising in combination and in optical alignment, a block of substance exhibiting the phenomenon of residual reflected ray formation and of sufficient thickness to absorb a large part of the radiations of shorter wavelength and adjacent to the wavelength band of said residual reflective ray, said block having a smooth residual reflected ray surface, and a selective detector for optical radiation within the wavelength band of the residual reflective ray.

2. A selective detecting apparatus according to claim 1 in which the wavelength band of the residual reflected ray is in the infrared.

3. A radiation selective detecting apparatus according to claim 2 in which the selective detector receiving the residual reflected ray comprises, in the direction of the reflected ray and in heat conductive contact, a layer of material having strong infrared absorption within the wavelength band of the residual reflective ray and no substantial absorption at wavelengths shorter than and immediately adjacent to said band, a mirror layer reflecting infrared and a detector layer capable of rapid change of electrical characteristics with temperature, whereby infrared radiation of the residual reflected ray is absorbed by the selective absorbing layer raising the temperature thereof, infrared radiation outside the band of the absorbing layer is reflected by the mirror layer and the element changing its electrical characteristics with temperature is heated by conduction from the absorbing layer.

4. A selective detecting apparatus according to claim 3 in which the layer exhibiting rapid change of electrical characteristics with temperature is a thermistor.

5. A selective detecting apparatus according to claim 1 for detection of infrared radiation in the 14 to 16 micron band of carbon dioxide emission in which the block of material producing the residual reflected ray is magnesium oxide.

6. A selective detecting apparatus according to claim 5 in which the detector receiving the residual reflected ray comprises, in the direction of the ray and in heat conducting contact, a layer of talc, a layer of infrared reflecting material forming a mirror and a thermistor whereby the thermistor changes temperature substantially only as a result of absorption of the residual reflected ray by the talc layer.

7. A selective detecting apparatus according to claim 6 which comprises, in optical alignment before the magnesium oxide block, a filter beginning strong infrared absorption at wavelengths just beyond 15 microns.

8. A selective detecting apparatus according to claim 7 in which the filter before the magnesium oxide block is a thin layer of mica.

9. A device for measuring temperature of the atmosphere which is substantially unaffected by local heat conditions which comprises, in combination and in optical alignment means, for permitting infrared radiation in the form of a beam to enter the device, a selective detector system responsive substantially only to infrared radiation within the band of emission of the molecules of a selected gaseous component of the atmosphere, a reference black body maintained at a predetermined temperature, periodic occulting means for the infrared beam, said occulting means being provided with reflecting means for reflecting an image of the reference black body on the detector during occultation, said occulting means operating at a frequency sufficiently low so that the infrared detector is responsive thereto, whereby the infrared detector produces a periodic response comparing the temperature produced from the infrared beam with that of the black body.

10. A device according to claim 9 in which the occulting means is a rotating chopper the blades of which carry an infrared mirror on their surfaces directed toward the infrared detector, the chopper being driven at a rate to occult the infrared beam at a frequency between 20 and 100 c.p.s.

11. A device according to claim 9 in which the infrared detector is responsive to infrared within the 14 to 16 micron emission band of carbon dioxide.

12. A device according to claim 9 in which the detector comprises a block of a substance exhibiting the phenomenon of residual reflected ray formation in the infrared and including a band of emission of a selected component of the atmosphere, the block being of sufficient thickness to absorb for radiations of shorter wavelength adjacent to the wavelength band of said residual reflected ray, said block having a smooth residual reflecting ray surface.

13. A device according to claim 12 in which the block is of magnesium oxide.

14. A device according to claim 11 in which the detector comprises, in optical alignment, an optical interference filter rejecting infrared of a wavelength just below 10 microns and a detector element comprising in heat conductive contact and in series, an absorbing layer of talc, an infrared mirror reflecting layer and a thermistor.

15. A device according to claim 14 in which the interference filter comprises a layer of sodium chloride between two thin layers of tellurium.

16. A device according to claim 9 in which the black body is a conical black body cavity and the detector is located in the apex thereof.

17. A device according to claim 11 in which the black body is a conical black body cavity and the detector is located in the apex thereof.

18. A device according to claim 12 in which the black body is a conical black body cavity and the detector is located in the apex thereof.

19. A device according to claim 13 in which the black body is a conical black body cavity and the detector is located in the apex thereof.

References Cited in the file of this patent

UNITED STATES PATENTS

| | | |
|---|---|---|
| 2,761,072 | Wormser | Aug. 28, 1956 |
| 2,826,703 | Bemis et al. | Mar. 11, 1958 |
| 2,844,728 | Munday | July 22, 1958 |
| 2,879,424 | Garbuny et al. | Mar. 24, 1959 |
| 2,895,049 | Astheimer et al. | July 14, 1959 |
| 2,903,592 | Bolay | Sept. 8, 1959 |
| 2,930,893 | Carpenter et al. | Mar. 29, 1960 |